United States Patent [19]
Fortune et al.

[11] Patent Number: 6,073,090
[45] Date of Patent: Jun. 6, 2000

[54] SYSTEM AND METHOD FOR INDEPENDENTLY CONFIGURING INTERNATIONAL LOCATION AND LANGUAGE

[75] Inventors: Erik Fortune, Mountain View; Gianni Mariani, San Jose, both of Calif.

[73] Assignee: Silicon Graphics, Inc., Mountain Views, Calif.

[21] Appl. No.: 08/839,778

[22] Filed: Apr. 15, 1997

[51] Int. Cl.[7] ................................................. G06F 17/38
[52] U.S. Cl. ............................................................. 704/8
[58] Field of Search ........................... 704/1, 8; 707/536, 707/530, 10; 708/112; 345/334, 333

[56] References Cited

U.S. PATENT DOCUMENTS

| | | | |
|---|---|---|---|
| 4,615,002 | 9/1986 | Innes ............................................ | 704/8 |
| 5,307,265 | 4/1994 | Winans ........................................ | 704/8 |
| 5,434,776 | 7/1995 | Jain .............................................. | 704/8 |
| 5,583,761 | 12/1996 | Chou ............................................ | 704/8 |
| 5,652,884 | 7/1997 | Palevich ...................................... | 395/651 |
| 5,664,206 | 9/1997 | Murrow et al. .............................. | 704/8 |
| 5,687,366 | 11/1997 | Harvey, III et al. ....................... | 395/610 |
| 5,734,597 | 3/1998 | Molnar et al. ............................... | 704/8 |
| 5,758,314 | 5/1998 | McKenna .................................... | 704/8 |
| 5,778,356 | 7/1998 | Heiny ........................................... | 707/2 |
| 5,907,326 | 5/1999 | Atkin et al. ................................. | 345/334 |
| 5,917,484 | 6/1999 | Mullaney .................................... | 345/333 |

OTHER PUBLICATIONS

Hall, W., "Adapt Your Program For Worldwide Use With Windows Internationalization Support," Microsoft Systems, Journal, Nov./Dec. 1991,pp. 29–58.

Van Camp, D., "Unicode and Software Globalization," Dr. Dobbs's journal, Mar. 1994, pp. 46, 48–50.

*Primary Examiner*—Forester W. Isen
*Assistant Examiner*—Patrick N. Edouard
*Attorney, Agent, or Firm*—Sterne, Kessler, Goldstein & Fox P.L.L.C.

[57] ABSTRACT

A system and method for independently configuring international location and language in a computer system generates composite locales for user-selected location and language combinations whenever a user-selected location and language combination is unsupported by default locales. The system includes a location format retrieval element for retrieving location-specific formatting data and a language format retrieval element for retrieving language-specific formatting data. A composite locale generator combines retrieved location-specific and language-specific data to generate a composite locale. In a preferred embodiment, a composite locale is generated from default locales. The location format retrieval element retrieves location-specific formatting data from a first default locale and the language format retrieval element retrieves language-specific formatting data from a second default locale. The composite locale is generated by combining the formatting data retrieved from the first and second default locales. In an alternative embodiment, a composite locale is generated from data retrieved from a location database and from a language database.

10 Claims, 14 Drawing Sheets

LOCATION: UNITED STATESLANGUAGE: AMERICAN ENGLISH

310 —
- CURRENCY: $
- NUMBERS: 1,000.00
- TIME: 1:00 PM
- DATE: MONTH/DAY/YEAR

312 —

| MONTHS OF THE YEAR | DAYS OF THE WEEK | DAYS ABBREVIATED | COMMON MESSAGES |
|---|---|---|---|
| 1. JANUARY | 1. MONDAY | 1. MON | YES |
| 2. FEBRUARY | 2. TUESDAY | 2. TUE | NO |
| 3. MARCH | 3. WEDNESDAY | 3. WED | |
| . | . | . | |
| . | . | . | |
| 12. DECEMBER | 7. SUNDAY | 7. SUN | |

EXAMPLE DEFAULT LOCALE

LOCATION: GERMANYLANGUAGE: GERMAN

314 —
- CURRENCY: DM
- NUMBERS: 1.000,00
- TIME: 13:00
- DATE: DAY/MONTH/YEAR

316 —

| MONTHS OF THE YEAR | DAYS OF THE WEEK | DAYS ABBREVIATED | COMMON MESSAGES |
|---|---|---|---|
| 1. JANUAR | 1. MONTAG | 1. MO | JA |
| 2. FEBRUAR | 2. DIENSTAG | 2. DI | NEIN |
| 3. MÄRZ | 3. MITTWOCH | 3. MI | |
| . | . | . | |
| . | . | . | |
| 12. DEZEMBER | 7. SONNTAG | 7. SO | |

EXAMPLE DEFAULT LOCALE

FIG. 3C

LOCATION: UNITED KINGDOM                                LANGUAGE: U.K. ENGLISH

318 — CURRENCY: £

NUMBERS: 1.000,00

TIME: 13:00

DATE: DAY/MONTH/YEAR

320 —

| MONTHS OF THE YEAR | DAYS OF THE WEEK | DAYS ABBREVIATED | COMMON MESSAGES |
|---|---|---|---|
| 1. JANUARY | 1. MONDAY | 1. MON | YES |
| 2. FEBRUARY | 2. TUESDAY | 2. TUE | NO |
| 3. MARCH | 3. WEDNESDAY | 3. WED | |
| . | . | . | |
| . | . | . | |
| . | . | . | |
| 12. DECEMBER | 7. SUNDAY | 7. SUN | |

EXAMPLE DEFAULT LOCALE

MAIN WINDOW OF ipanel, SHOWING SEPARATE BUTTONS FOR COUNTRY AND LANGUAGE

LANGUAGE DIALOG WITH DEFAULT LANGUAGES FOR SWITZERLAND, DEMONSTRATING EASY ACCESS TO COMMON COMBINATIONS

LANGUAGE DIALOG WITH ALL SUPPORTED LANGUAGES, SHOWING EASE-OF-USE FOR UNCOMMON COMBINATIONS. HERE, THE USER HAS SELECTED THE DANISH LANGUAGE FOR USE IN SWITZERLAND

MAIN WINDOW AFTER CONFIGURATION, DEMONSTRATING USE OF DANISH WITH SWITZERLAND. IF DANISH MESSAGE CATALOGS WERE INSTALLED, ALL OF THE LABELS WOULD BE IN DANISH

LOCATION: UNITED STATES           LANGUAGE: GERMAN

310 —
- CURRENCY: $
- NUMBERS: 1,000.00
- TIME: 1:00 PM
- DATE: MONTH/DAY/YEAR

316 —

| MONTHS OF THE YEAR | DAYS OF THE WEEK | DAYS ABBREVIATED | COMMON MESSAGES |
|---|---|---|---|
| 1. JANUAR | 1. MONTAG | 1. MO | JA |
| 2. FEBRUAR | 2. DIENSTAG | 2. DI | NEIN |
| 3. MÄRZ | 3. MITTWOCH | 3. MI | |
| . | . | . | |
| . | . | . | |
| . | . | . | |
| 12. DEZEMBER | 7. SONNTAG | 7. SO | |

EXAMPLE COMPOSITE LOCALE

LOCATION: UNITED KINGDOM           LANGUAGE: AMERICAN ENGLISH

318 —
- CURRENCY: £
- NUMBERS: 1.000,00
- TIME: 13:00
- DATE: DAY/MONTH/YEAR

312 —

| MONTHS OF THE YEAR | DAYS OF THE WEEK | DAYS ABBREVIATED | COMMON MESSAGES |
|---|---|---|---|
| 1. JANUARY | 1. MONDAY | 1. MON | YES |
| 2. FEBRUARY | 2. TUESDAY | 2. TUE | NO |
| 3. MARCH | 3. WEDNESDAY | 3. WED | |
| . | . | . | |
| . | . | . | |
| . | . | . | |
| 12. DECEMBER | 7. SUNDAY | 7. SUN | |

EXAMPLE COMPOSITE LOCALE

FIG. 11

| | UNITED STATES | U.K. | FRANCE | GERMANY | SPAIN | ETC. |
|---|---|---|---|---|---|---|
| CURRENCY | $ | £ | F | DM | L | |
| NUMBERS | 1,000.00 | 1.000,00 | 1.000,00 | 1.000,00 | 1.000,00 | |
| TIME | 1:00 PM | 13:00 | 13:00 | 13:00 | 13:00 | |
| DATE | MO/DAY/YR | DAY/MO/YR | DAY/MO/YR | DAY/MO/YR | DAY/MO/YR | |
| ETC. | | | | | | |

FIG. 12

| | | U.S. ENGLISH | U.K. ENGLISH | FRENCH | GERMAN | SPANISH | ETC. |
|---|---|---|---|---|---|---|---|
| MONTHS OF THE YEAR | 1 | JANUARY | JANUARY | JANVIER | JANUAR | ENERO | |
| | 2 | FEBRUARY | FEBRUARY | FÉVRIER | FEBRUAR | FEBRERO | |
| | 3 | MARCH | MARCH | MARS | MÄRZ | MARZO | |
| | 4 | APRIL | APRIL | AVRIL | APRIL | ABRIL | |
| | 5 | MAY | MAY | MAI | MAI | MAYO | |
| | 6 | JUNE | JUNE | JUIN | JUNI | JUNIO | |
| | 7 | JULY | JULY | JUILLET | JULI | JULIO | |
| | 8 | AUGUST | AUGUST | AOÛT | AUGUST | AGOSTO | |
| | 9 | SEPTEMBER | SEPTEMBER | SEPTEMBRE | SEPTEMBER | SEPTIEMBRE | |
| | 10 | OCTOBER | OCTOBER | OCTOBRE | OKTOBER | OCTUBRE | |
| | 11 | NOVEMBER | NOVEMBER | NOVEMBRE | NOVEMBER | NOVIEMBRE | |
| | 12 | DECEMBER | DECEMBER | DÉCEMBRE | DEZEMBER | DICIEMBRE | |
| DAYS OF THE WEEK | 1 | MONDAY | MONDAY | LUNDI | MONTAG | LUNES | |
| | 2 | TUESDAY | TUESDAY | MARDI | DIENSTAG | MARTES | |
| | 3 | WEDNESDAY | WEDNESDAY | MERCREDI | MITTWOCH | MIÉRCOLES | |
| | 4 | THURSDAY | THURSDAY | JEUDI | DONNERSTAG | JUEVES | |
| | 5 | FRIDAY | FRIDAY | VENDREDI | FREITAG | VIERNES | |
| | 6 | SATURDAY | SATURDAY | SAMEDI | SAMSTAG | SABADO | |
| | 7 | SUNDAY | SUNDAY | DIM | SONNTAG | DOMINGO | |
| ABBREVIATED DAYS OF THE WEEK | 1 | MON | MON | LUN | MO | LUN | |
| | 2 | TUE | TUE | MAR | DI | MAR | |
| | 3 | WED | WED | MER | MI | MIÉR | |
| | 4 | THU | THU | JEU | DO | JUE | |
| | 5 | FRI | FRI | VEN | FR | VIE | |
| | 6 | SAT | SAT | SAM | SA | SA | |
| | 7 | SUN | SUN | DIM | SO | DO | |
| MESSAGES | YES | YES | YES | OUI | JA | SI | |
| | NO | NO | NO | NON | NEIN | NO | |
| | ETC. | | | | | | |

SYSTEM AND METHOD FOR INDEPENDENTLY CONFIGURING INTERNATIONAL LOCATION AND LANGUAGE

BACKGROUND OF THE INVENTION

1. Field of the Invention

The present invention relates generally to configuring the user interface of a computer system and, more particularly, to configuring the user interface of a computer system based on a selected language and international location.

2. Related Art

Typical computer systems, such as personal computers and workstations, can output alpha-numeric data to users in any of a variety of formats. Computer systems may employ any of a number of different format parameters for generating this output. Some format parameters, such as font and size, are completely arbitrary and may be set according to a user's desire. Other format parameters, however, are dependent upon the user's language. For example, a computer system should display days of the week and months of the year in a language which the user can understand. Preferably, the computer system permits users to select a language from a menu list of languages.

Yet other formats, such as numerical formats and date formats, depend on the user's geographic location. In the United States, for example, conventional practice for numerical display is to use a comma to separate the hundreds column from the thousands column as in, for example, the number 5,325. In addition, a period is used as a decimal point to separate the ones column from the tenths column as in, for example, the number 5,325.75. In some other countries, however, the roles of the period and comma are reversed so that the number which is written in the United States as 5,325.75, is instead written as 5.325,75. Also in the United States, conventional practice for abbreviating dates is month/day/year. Thus, Jan. 8, 1997 is abbreviated as Jan. 8, 1997. In some other countries, however, the accepted format is day/month/year, so that Jan. 8, 1997 is written as Jan. 8, 1997. It is important, therefore, that a computer system be able to alter its output based upon a user's language and geographic region.

Typically, language specific and location specific formatting parameters are maintained in locales. A locale is a file or group of files which contain formatting parameters for a computer system. A typical locale may have fifty or more fields for specifying data strings. These data strings specify how to display or output language specific data such as, for example, months of the year, days of the week and some common terms such as "yes" and "no." These data strings also specify how to format numeric data such as, for example, monetary values, time and dates. A locale may also include a database of messages for various system commands.

Locales may be classified according to the types of data they store. For example, in some Unix systems, locales can be grouped into six categories of related fields. An LC_CTYPE category of fields includes information about characters used by a locale, such as which characters are uppercase, which are printable, etcetera. An LC_NUMERIC category of fields includes information regarding non-monetary numeric values, such as whether to use a comma or a period as the decimal point. An LC_TIME category of fields includes names for months, days of the week and information for formatting dates and time. An LC_COLLATE category of fields includes information for sorting strings in the locale. An LC_MONETARY category of fields includes information for formatting monetary values, including monetary symbols and whether the symbol precedes or follows the value. An LC_MESSAGES category of fields includes strings to use for the messages displayed by various commands of the computer system.

The syntax for locale specifications allows the user to choose each category from a different locale (e.g. /es/es/es/es/es/fr, which would use Spanish/Spain for everything except the messages, which are to be French/France). Most people generally use the simple form, which consists of one name for all of the fields (e.g. "es" for Spanish/Spain).

In other Unix systems, and in other systems besides Unix systems, locales may be classified in other ways and may store any of a variety of types of language specific and location specific formatting data.

Typically, locales are maintained independent of any application programs running on a computer system. Locales may, for example, be maintained as part of an operating system. Alternatively, locales may be maintained separate from an operating system, for example, as a separate program or application which runs cooperatively with an operating system.

Presently available systems for formatting outputs from a computer system can be divided into two types. The first type employs a database of locales. Each locale in the database is encoded for a particular language and geographic location combination. The user may select a locale from a list of supported locales.

For example, a user may select a United States locale from a list of available locales. Such a locale will typically permit the computer to provide output in English or American English and will employ standard U.S. numerical and date formatting. Alternatively, a user may select a Germany locale from a list of available locales. In that case, the computer system will provide displays in a German language and will employ standard German or European number and date formatting. Such systems are simple to use because they require little input from the user.

This first type of system, however, is inflexible because not all possible language and locations are supported by default locales. Thus, a user cannot select a language and location combination unless it is supported by an existing locale. For example, a person from the U.S. who is visiting Germany may wish to employ a locale providing words in American English but currency symbols and date and time formats in the format of the host country. Without a supporting locale, however, the user must choose between a locale which lacks the desired language and a locale which lacks the desired monetary and number formatting.

The second type of system for formatting computer outputs permits users to edit individual fields which make up a locale. However, because a locale may include thirty fields or more, editing a locale in this second type of system is arduous.

What is needed, therefore, is a system and method for providing a user with a choice of languages and a choice of geographic locations and for generating new composite locales whenever a selected language and location combination is not supported by an existing, or default, locale.

SUMMARY OF THE INVENTION

The present invention provides a system and method for generating new composite locales for unsupported language and location combinations selected by a user. The system and method generates new locales for language and location combinations with minimal input from a user.

Briefly, a user selects a geographic location from a list of geographic locations. The system then attempts to guess the appropriate language based upon the geographic location. For example, if a user selects the United States, the system may guess American English as the interface language.

The system also provides the user with additional languages in the event that a language other than the guessed language is desired. If the user selects one of these additional languages, the system determines whether a default locale exists for the selected location and language combination. If a default locale already exits for the selected combination, that default locale is used by the system. If, however, a default locale does not exist, the system automatically generates a new, or composite, locale for the selected location and language combination.

In a preferred embodiment, generation of a new composite locale is performed by identifying a first default locale which employs the selected country and a second default locale which employs the selected language. Portions of the first default locale are then combined with portions of the second default locale to generate a composite locale for the selected language and location combination.

Preferably, the new composite locale employs location-specific data formatting parameters such as, for example, monetary symbols, numeric, time and date formats from the first default locale. The new composite locale also preferably employs language-specific formatting parameters such as, for example, names for months of the year, days of the week and some common terms for messages, such as, for example, "yes" and "no," from the second default locale. New composite locales may be stored as default locales for future use as well.

Thus, by selecting a geographic location and a language, a composite locale is automatically generated which will enable the computer system to output data in a format appropriate to the geographic location and language of the user. The system and method are fast and simple to use, yet provide great flexibility.

In an alternative embodiment, the system and method employ a location database and a language database. The location database stores location-specific format data such as, for example, monetary symbols, numeric formatting and time and date formats. The language database stores language-specific format data such as, for example, months of the year, days of the week and some common terms for messages, such as, for example, "yes" and "no."

In this alternative embodiment, composite locales are generated by combining location-specific format data retrieved from the location database with language-specific format data retrieved from the language database. New composite locales may be stored as default locales for future use as well. Alternatively, this embodiment may dispense with stored locales entirely and simply generate a new locale each time a selected language or location is changed.

Further features and advantages of the present invention, as well as the structure and operation of various embodiments of the present invention, are described in detail below with reference to the following drawings.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art to make and use the invention.

FIG. 3A illustrates an example of a default locale employing location-specific data for the United States and language-specific data for United States English.

FIG. 3B illustrates an example of a default locale employing location-specific data for Germany and language-specific data for German.

FIG. 3C illustrates an example of a default locale employing location-specific data for the United Kingdom and language-specific data for United Kingdom English.

FIG. 9A illustrates an example of a composite locale generated for the United States as the location and German as the language, according to the process of FIG. 4.

FIG. 9B illustrates an example of a composite locale generated for the United Kingdom as the location and United States English as the language, according to the process of FIG. 4.

FIG. 11 is a preferred table of location-specific data stored in the location database of FIG. 10.

FIG. 12 is a preferred table of language-specific data stored in the language database of FIG. 10.

Figure 1:
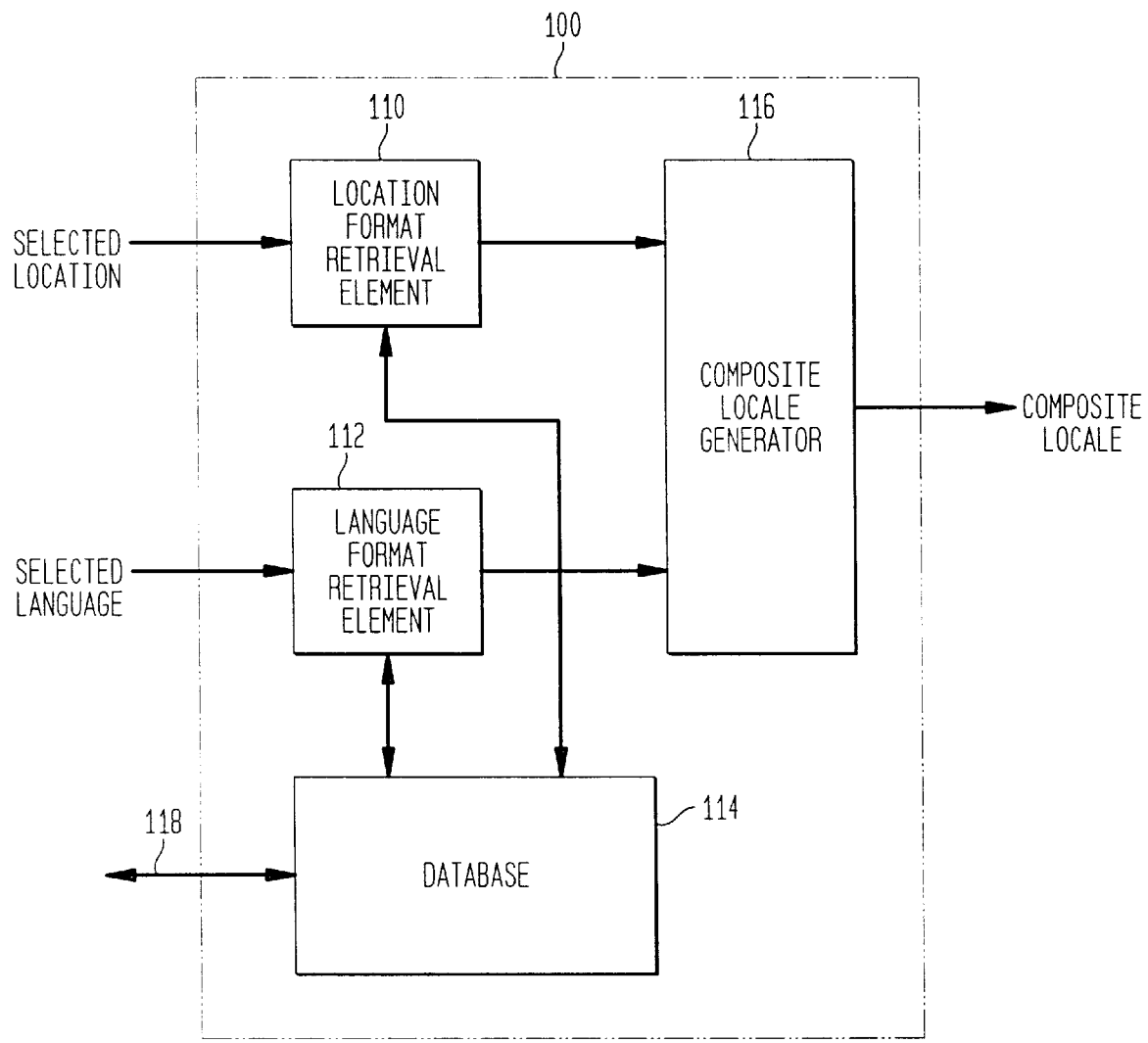
FIG. 1 is a block-level diagram of a system for automatically configuring international location and language in a computer system.

The present invention will now be described with reference to the accompanying drawings. In the drawings, like reference numbers typically indicate identical or functionally similar elements. Additionally, the left-most digit(s) of a reference number typically identifies the drawing in which the reference number first appears.

Detailed Description of the Preferred Embodiments

Referring to FIG. 1, a system 100 is shown for independently configuring international location and language in a computer system. System 100 is preferably embodied in software or firmware, although one skilled in the art will readily recognize that it could also be realized in any combination of software, firmware and hardware.

System 100 includes a location format retrieval element 110 for receiving a selected location from a user and for retrieving location-specific formatting data from a database 114. System 100 also includes a language format retrieval element 112 for receiving a selected language from a user and for retrieving language-specific formatting data from database 114.

A composite locale generator 116 is employed by system 100 for receiving location-specific formatting data from location format retrieval element 110 and language-specific formatting data from language format retrieval element 112. Composite locale generator 116 then generates composite locales from the received location and language data. Alternatively, composite locale generator could receive language-specific and location-specific formatting data directly from database 114 as a result of data sent to database 114 from elements 110 and 112.

In a preferred embodiment, database 114 is a database of default locales. Each default locale contains output formatting data for a particular location and language combination. In an alternative embodiment, database 114 includes a location database and a language database. An optional access bus 118 may be provided to permit other systems (not shown) to access database 114, as discussed below in step 412 of FIG. 4.

Figure 2:
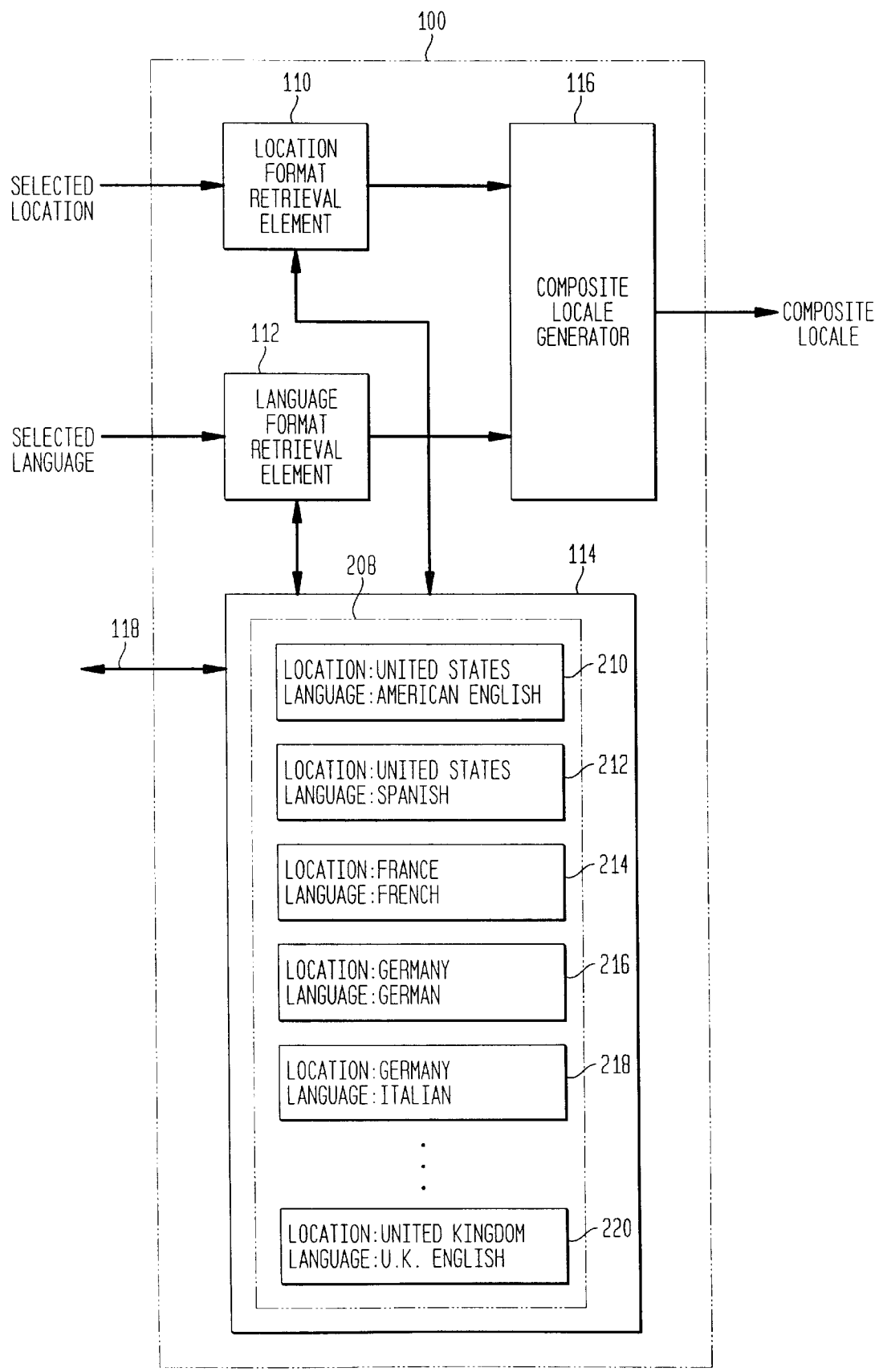
FIG. 2 is a block-level diagram of the system of FIG. 1 including a database of default locales.

Referring to FIG. 2, in a preferred embodiment of system 100, database 114 includes a default locale database 208 which includes a plurality of default locales 210–220. Each default locale 210–220 includes output formatting data for a particular location and language combination. Default locale 210, for example, which identifies the United States as the location and American English as the language, will contain output formatting data necessary for displaying information in standard or accepted United States formats and in American English.

Default locales 210–220 may be maintained as part of an operating system or as part of an application program. Output formatting data contained within default locales 210–220 are typically generated by a computer programmer before the operating system or applications program is made available to a user. Default locales 210–220 may include default locales which are currently available in any of a number of presently available operating systems and applications programs. In an attempt to provide as many possible location and language combinations as possible, a typical computer system may include tens or hundreds of default locales 210–220. Each default locale, however, requires a certain amount of memory space and a certain amount of programmer time to develop. Thus, it would be inefficient to generate and store default locales for every possible language and location combination.

Referring to FIGS. 3A and 3B, sample contents of default locales 210, 216 and 220 are provided. This sample data is provided for representative purposes. Actual default locales may include any of a variety of data in place of or in addition to that provided in FIG. 3.

Default locale 210 includes location-specific formatting data 310 for the United States and language-specific formatting data 312 for United States English. Location-specific formatting data 310 contains formatting data for currency, numbers, time and dates. More specifically, data 310 provides that currency is to be displayed as U.S. dollars ($), numbers are to be displayed with a comma (,) separating hundreds from thousands and with a period (.) as the decimal point, time is to be displayed as a.m. or p.m. and date is to be displayed as month/day/year.

Language-specific formatting data 312 provides for months 1–12 as January, February, March . . . December and days of the week 1–7 as Monday, Tuesday, Wednesday . . . Sunday. Language-specific formatting data 312 also includes abbreviations for days of the week and common terms "yes" and "no."

Default locale 216 includes location-specific formatting data 314 for Germany and language-specific formatting data 316 for German. Location-specific formatting data 314 contains formatting data for currency, numbers, time and dates. More specifically, data 314 provides that currency is to be displayed as Deutsche Marks (DM), numbers are to be displayed with a period separating hundreds from thousands and with a comma as the decimal point. In addition, time is based on a twenty four hour clock and date is to be displayed as day/month/year.

Language-specific formatting data 316 provides for months 1–12 as Januar, Februar, März, . . . Dezember and days of the week 1–7 as Montag, Dienstag, Mittwoch . . . Sonntag. Language-specific formatting data 312 also includes abbreviations for days of the week and common terms "ja" and "nein," (yes and no).

Default locale 220 provides location-specific data 318 for the United Kingdom (UK) and language-specific formatting data 316 for UK English. The many similarities between American English and UK English are reflected much of the data stored in default locales 210 and 220. There are, however, several noticeable distinctions between location-specific data 310 and data 318. For instance, location-specific format data 318 indicates that the currency is to be displayed as British pounds (£) and that periods are to be used as the decimal point. Moreover, location data 314 provides for the date to be displayed as day/month/year rather than month/day/year as in location-specific data 310.

Figure 4:
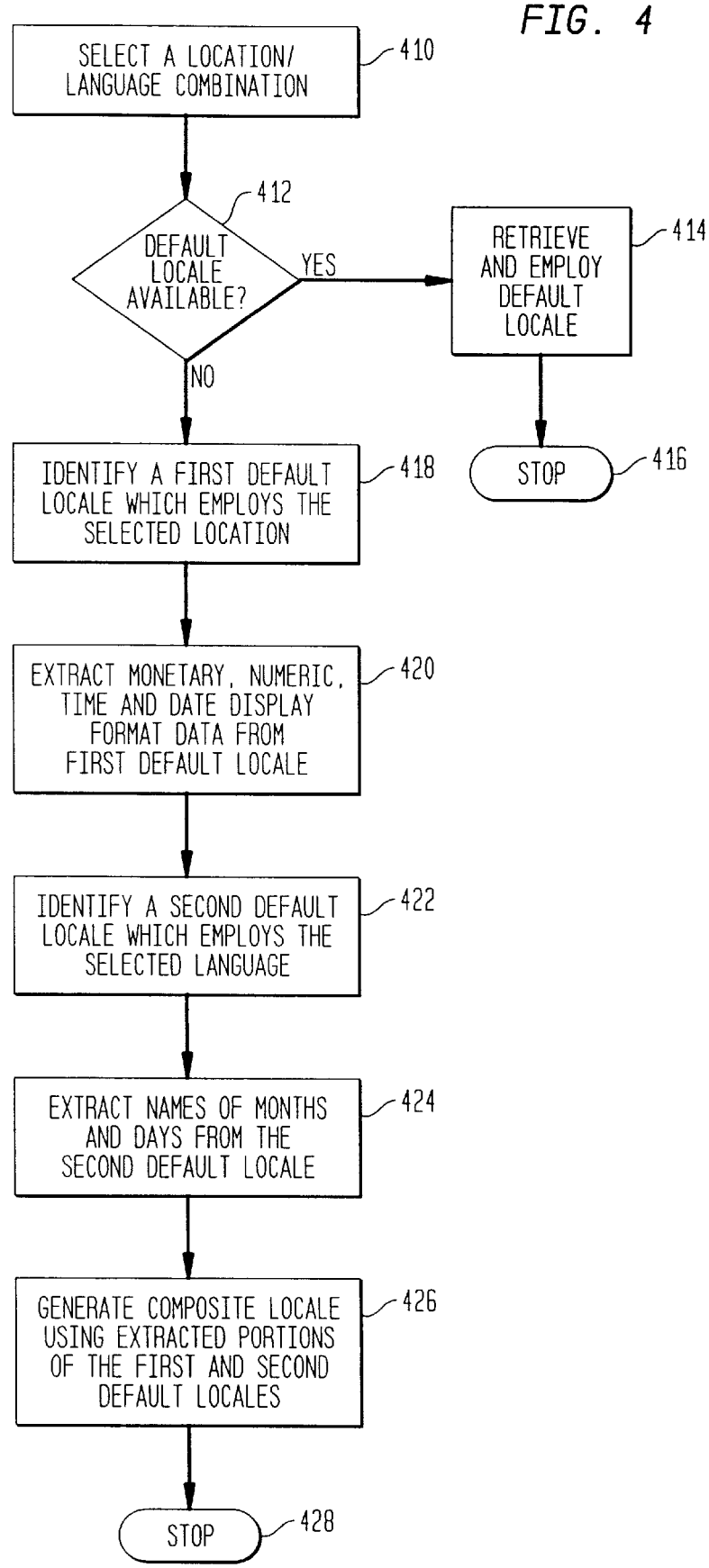
FIG. 4 is a process flowchart providing a preferred method for generating composite locales.

Referring to FIG. 4, a method for generating user-specified locales from default locales, such as default locales 210, 216 and 220, is provided. The method is preferably implemented via software or firmware. However, one skilled in the art will readily recognize that the method could also be implemented via any of a variety of combinations of software, firmware and hardware.

Figure 5:
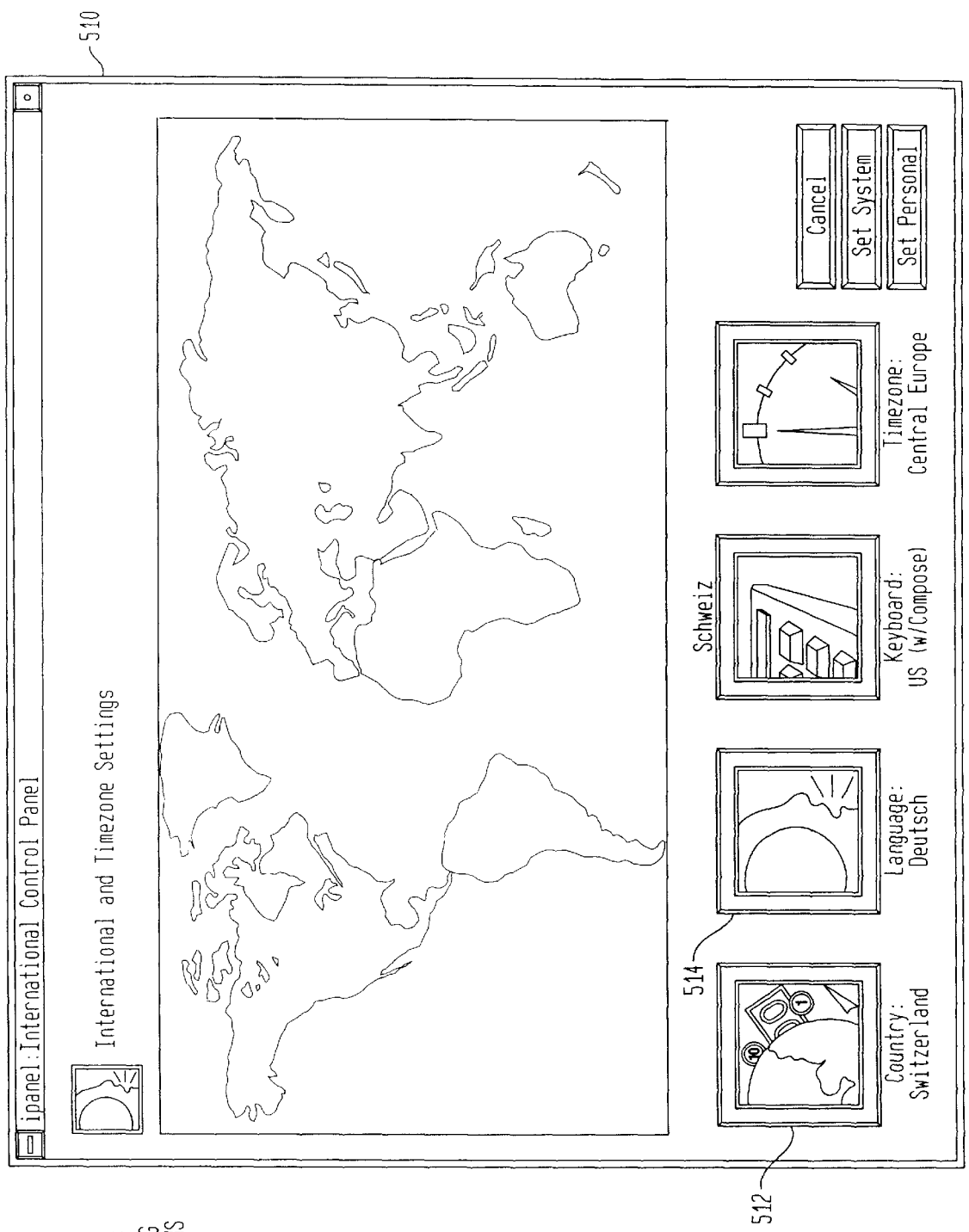
FIG. 5 is a preferred display window presented to a user for changing a selected language and location combination.

In step 410, a display is presented to a user, prompting the user to select a location and language combination. For example, in FIG. 5, a display 510 may be presented to the user for selecting a location and language combination. Display 510 includes a country designation area 512, indicating Switzerland as the selected country. Display 510 also includes a language designation area 514, indicating Deutsch, or German, as the selected language. Preferably, a user may employ a pointing device, such as a mouse, to point to area 512 to change a selected country and to point to area 514 to change a selected language.

Figure 6:
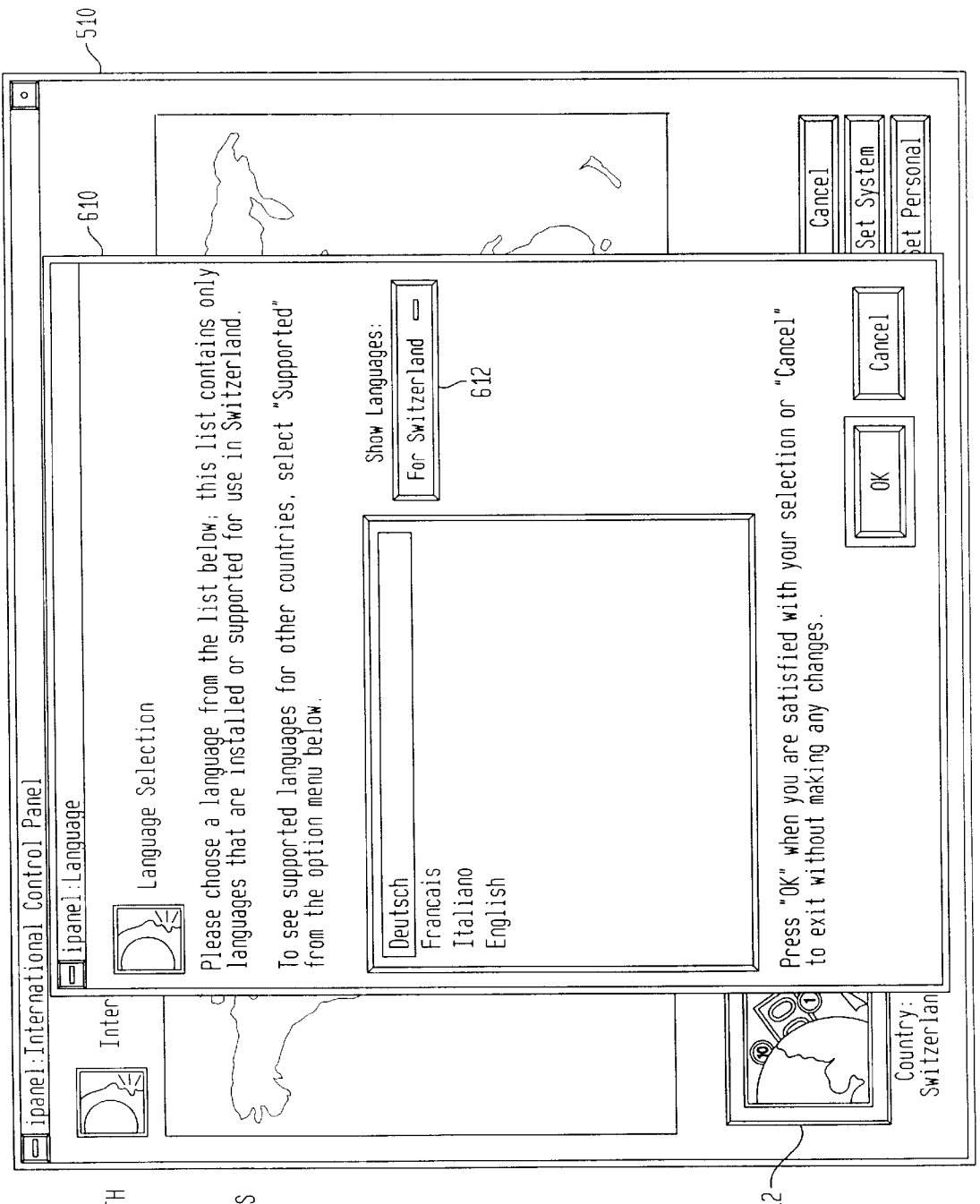
FIG. 6 is a preferred display window presented to a user for selecting a language supported by a default locale for a selected location.

Referring to FIG. 6, upon selection of language designation area 514, the user may be presented with a display such as, for example, display 610. Display 610 provides a list of languages which are supported by existing default locales for the selected location, Switzerland. In this example, the currently supported languages for Switzerland are Deutsch, Français, Italiano and English.

Figure 7:
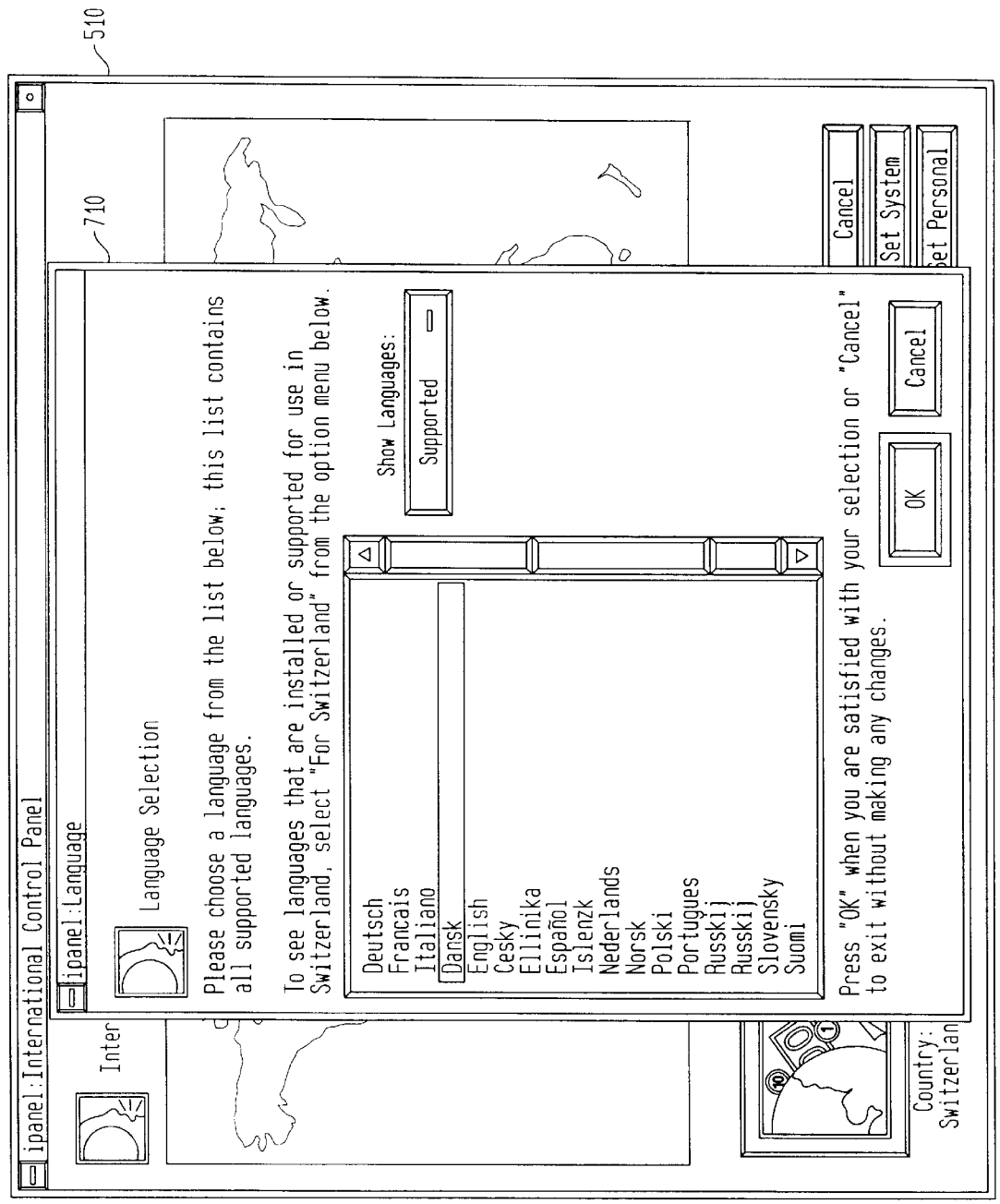
FIG. 7 is a preferred display window presented to a user for selecting a language other than a language supported by a default locale for a selected location.
Figure 8:
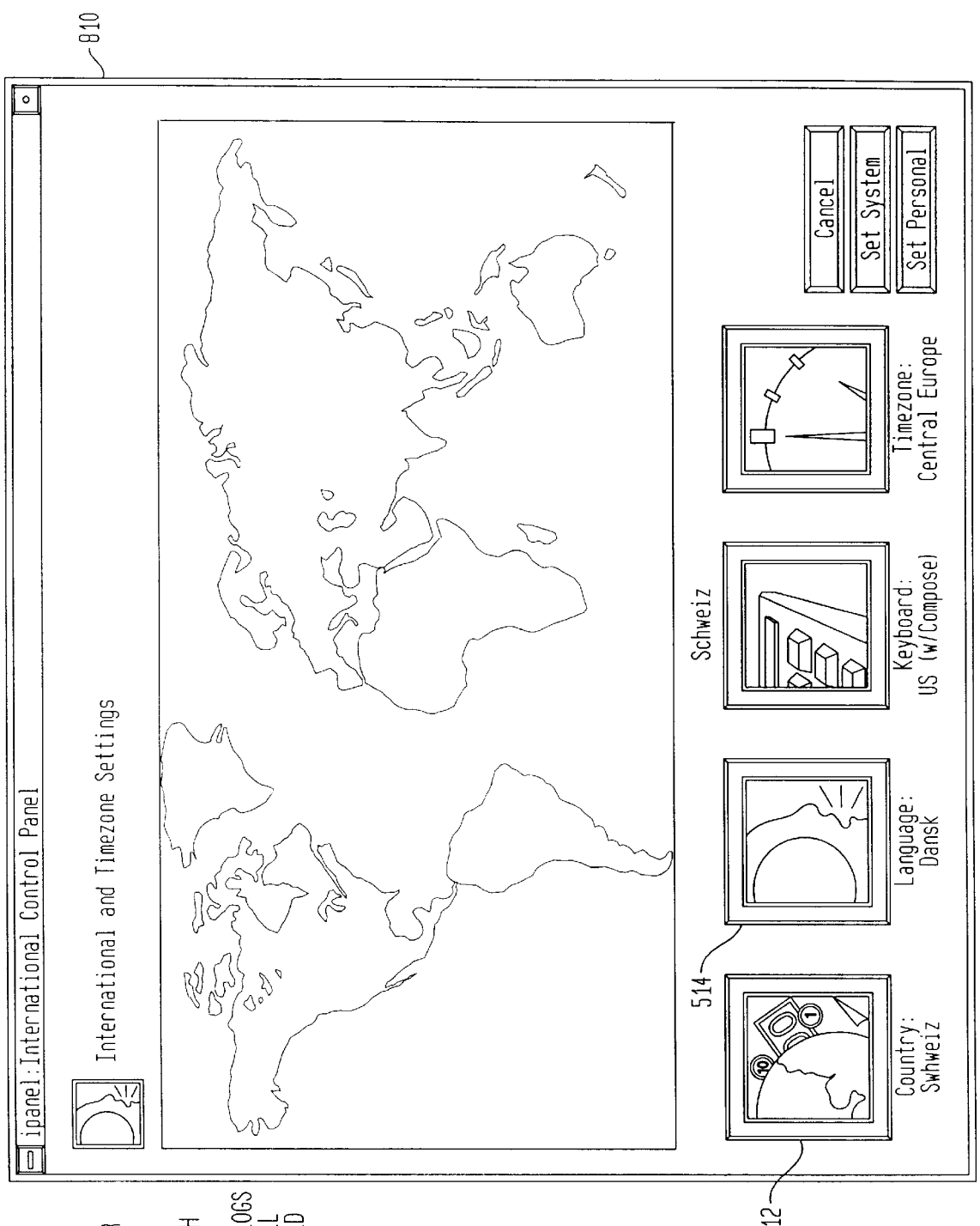
FIG. 8 is a preferred display window presented to a user for indicating a user-selected language and location combination.

In FIG. 6, users can select additional languages not presently supported by existing default locales by pointing to language selection area 612 with a pointer device such as a mouse. Upon pointing to area 612, the user is preferably presented with display 710, shown in FIG. 7. Display 710 provides a list of languages which are employed by other default locales within database 208. The user may select any of the languages listed, such as, for example, Dansk (or Danish). Referring to FIG. 8, upon selecting the language Dansk from display 710, display 510 is updated as shown as display 810 of FIG. 8

Referring back to FIG. 4, in step 412, after the user selects a location and language combination, a determination is made as to whether the selected location and language combination are supported by an existing default locale. Preferably, step 412 is performed by system 100. However, where system 100 is integrated with a pre-existing system (not shown), and where the pre-existing system includes a routine for determining whether a default locale exists for a selected language and location combination, step 412 could be performed by the pre-existing system rather than by system 100. In such a case, the pre-existing system may access default locale database 208 directly, via access bus 118.

If a user selects one of the presently supported languages, control passes to step 414 where the associated default locale is retrieved for use by the computer system. Processing then stops at step 416.

If, in step 412, no existing default locale was found for the selected location and language combination, control passes to step 418. In step 418, a first default locale which employs the selected location is identified. Step 418 is preferably performed by location format retrieval element 110, although a separate element or routine (not shown) could be used for performing step 418.

In step 420, location format retrieval element 110 extracts location-specific formatting data from the first default locale identified in step 418. This information may include, for example, monetary, numeric, time and date display formatting data. For example, in step 420, data 310 may be extracted from default locale 210. Alternatively, element 110 may simply direct the identified locale to send the necessary information directly to composite locale generator 116.

In step 422, a second default locale which employs the language selected in step 410 is identified. This step is preferably performed by language format retrieval element 112, although a separate element or routine (not shown) could be used for performing step 422.

In step 424, language format retrieval element 112 retrieves language-specific formatting data from the second default locale identified in step 422. The language format data may include, for example, months of the year, days of the week, abbreviations for days of the week and various messages, in the selected language. Alternatively, element 112 may direct the identified locale to send the necessary information directly to composite locale generator 116.

In step 426, composite locale generator receives formatting information from the first and second default locales identified in steps 418 and 422. Composite locale generator 116 then generates a composite locale using the extracted portions of the first and second default locales. The composite locale will contain formatting data needed by the computer system for outputting data according to the selected language and location combination.

Once a composite locale is generated by composite locale generator element 116, for the selected location and language combination, the composite locale is output from system 100 for use by the computer system. Preferably, composite locales generated by composite locale generator element 116 are stored in database 114 to be used or stored in database 114 as default locales and are made available to the system for future occurrences of step 412. Processing then terminates in step 428.

The method of FIG. 4 is thus configured to be employed in a pre-existing system containing any number of default locales, where new composite locales can be generated from the pre-existing default locales. The method of FIG. 4 may also be employed as an integral part of a new system.

Referring to FIG. 9A, an example composite locale 910, generated from locales 210 and 216, by the method of FIG. 4, includes location-specific formatting data 310 from default locale 210 and language-specific formatting data 316 from default locale 216. Composite locale 910 thus employs location-specific formatting data for the United States and language-specific formatting data for the German language.

Referring to FIG. 9B, an example composite locale 912, generated from locales 210 and 220, by the method of FIG. 4, includes location-specific formatting data 318 from default locale 220 and language-specific formatting data 310 from default locale 210. Composite locale 912 thus employs location-specific formatting data for the United Kingdom and language-specific formatting data for the United States.

Figure 10:
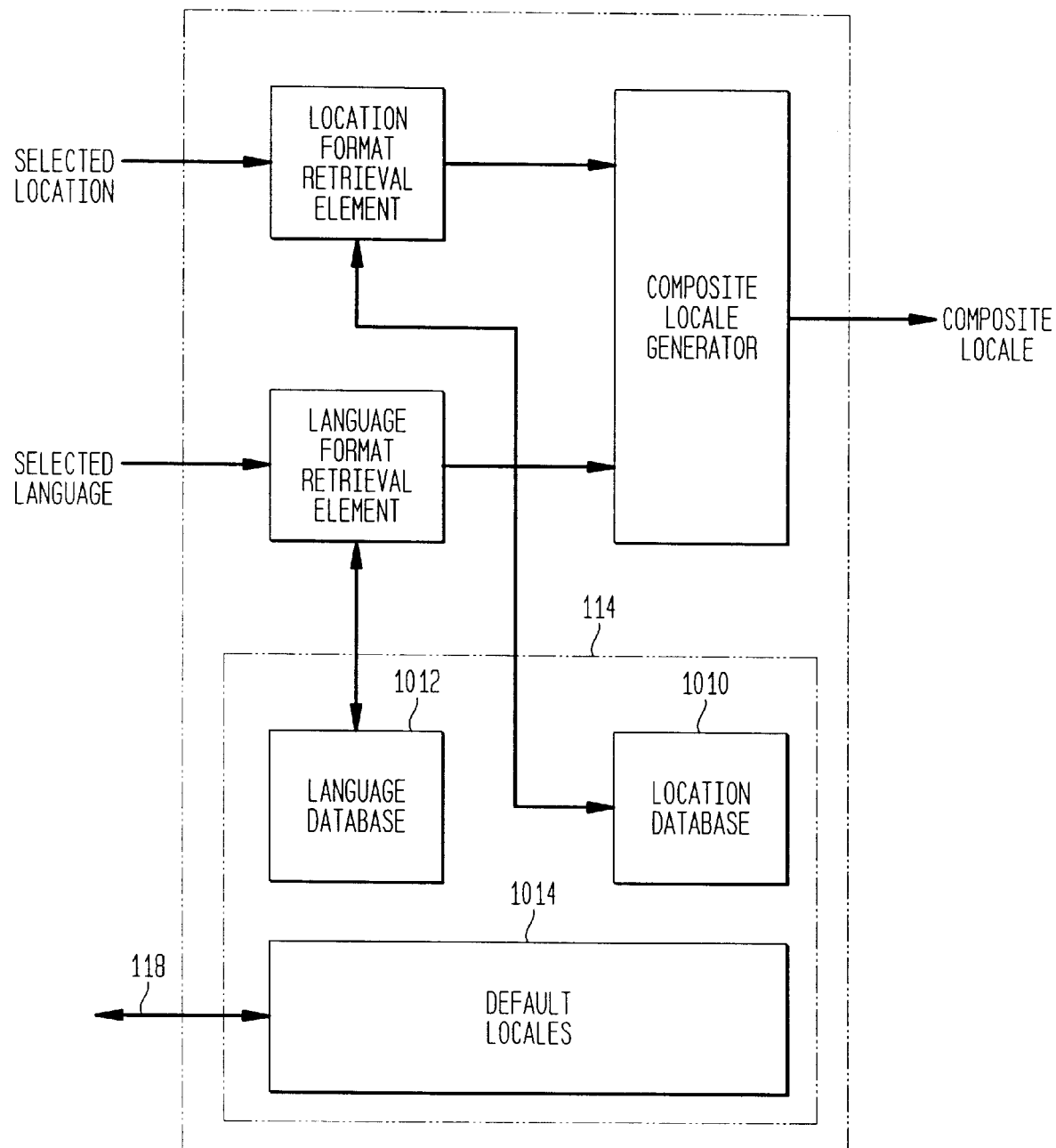
FIG. 10 is an alternative embodiment of the system of FIG. 1, wherein composite locales are generated from a location database and a language database.

Referring to FIG. 10, alternative embodiment of the present invention is provided. In the alternative embodiment, database 114 includes a location database 1010 and a language database 1012. Location database 1010 contains location-specific formatting data such as, for example, currency symbols, number display formats, time display formats and date display formats. Language database 1012 includes language-specific formatting data such as, for example, months of the year, days of the week, abbreviated days of the week and various messages. Preferably, database 114 also includes a default locale database 1014, which may include pre-existing default locales, such as default locales 210–220.

Referring to FIG. 11, table 1110 represents one possible example of database 1010. Table 1110 includes geographic locations 1112 such as, for example, United States, United Kingdom, France, Germany, Spain, etc. Table 1110 also includes location-specific variables 1114 such as, for example, currency symbols, number display formats, time display formats and date display formats. Theoretically, there is no limit to the number of locations 1112 nor the number or types of location-specific variables 1114 which may be supported by location database 1010. Location-specific formatting data for a particular location includes the data shown at the intersection of the selected location 1112 and each of the variables 1114.

Referring to FIG. 12, table 1210 illustrates one possible example of language database 1012. Table 1210 includes a list of languages 1212 supported by language database 1012. Table 1210 includes language-specific variables 1214 such as, for example, months of the year, days of the week, abbreviated days of the week and various messages. Theoretically, there is no limit to the number of languages 1212 nor the number or types of language-specific variables 1214 which may be supported by language database 1012. Database 1012 permits a computer system to display language-specific variables 1214 in the selected language. Language-specific formatting data for a particular language includes the data shown at the intersection of the selected language 1212 and each of the variables 1214.

Figure 13:
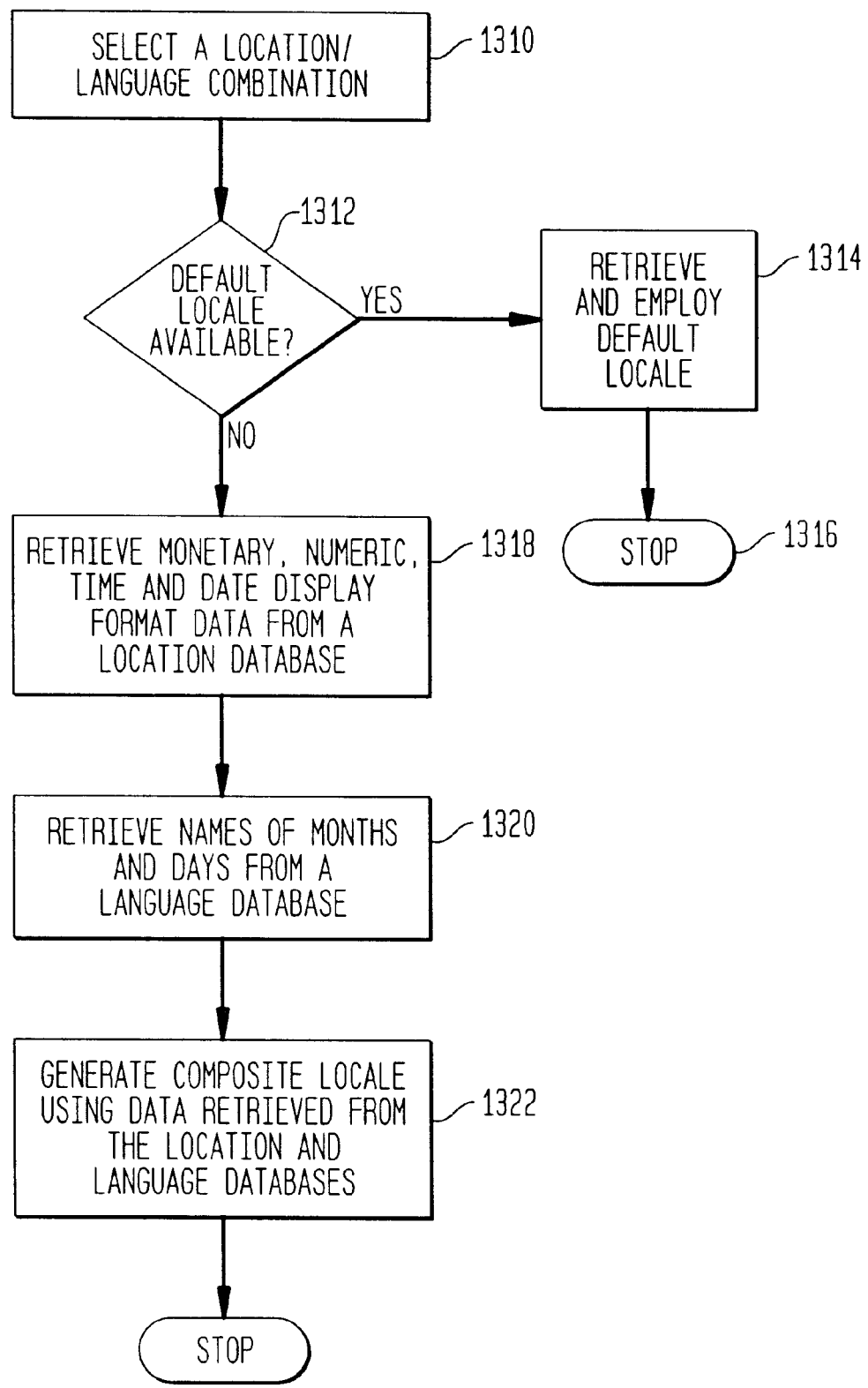
FIG. 13 is a process flowchart providing an alternative method for generating composite locales.

Referring to FIG. 13, an alternative method for generating composite locales, using location database 1010 and language database 1012, is provided. The method is preferably implemented via software or firmware. However, one skilled in the art will readily recognize that the method could also be implemented via any of a variety of combinations of software, firmware and hardware.

Steps 1310–1316 are substantially similar to steps 410–416. In step 1310, a user selects a location and language combination. The user may be provided with a series of displays such as displays 510, 610, 710 and 810, as previously described.

In step 1312, if it is determined that the selected location and language combination is supported by an existing default locale, the process moves to step 1314 where the default locale is retrieved for use by the computer system. Processing then stops at step 1316. If, however, the selected location and language combination is not supported by an existing default locale, processing moves to step 1318.

In step 1318, location format retrieval element 110 accesses location database 1010 and retrieves location-specific formatting data for a selected country 1112. Alternatively, element 110 may direct database 1010 to send the requested data directly to composite locale generator 116. Location-specific data may include, for example, numeric, time, currency, and date display format data.

In step 1320, language format retrieval element 112 accesses language database 1012 and retrieves language-specific format display data for a selected language 1212. Language-specific variables 1214 may include, for example, months of the year, days of the week, abbreviations for days of the week and various messages. Alternatively, element 112 may direct database 1012 to send the requested data directly to composite locale generator 116.

In step 1322, composite locale generator element 116 receives the data retrieved in steps 1218 and 1220 and generates a composite locale therefrom. The generated composite locale is then output from element 116 for use in the computer system. Preferably, the output composite locale is also sent to a default locale database, such as default location database 1014, for future occurrences of step 1212.

Alternatively, database 114 may omit default locale database 1014, in which case, steps 1312–1316 are omitted from the method of FIG. 13. Using this approach, each time a language or location selection is changed, a composite locale is generated, regardless of whether the same language and location combination had been employed by the computer system in the past.

The specifications in the above description should not be construed as limitations on the scope of the invention, but rather as specifications of the preferred embodiment. Other obvious variations and modifications are possible, and will occur to persons skilled in the art.

What is claimed is:

1. A method of independently configuring international location and language in a computer system, comprising the steps of:
   (1) selecting a location and a language combination;
   (2) determining whether the selected combination is supported by an existing default locale; and
   (3) if the selected combination is not supported by a default locale, generating a composite locale for specifying output formats consistent with the selected combination, comprising the steps of
      (a) identifying a first default locale which employs formatting data for the selected location;
      (b) identifying a second default locale which employs formatting data for the selected language; and
      (c) automatically generating the composite locale for the selected combination from the first and second default locales.

2. The method of claim 1, wherein step (c) comprises the steps of:
   (i) employing monetary, numeric, time and date display formats employed by the first default locale for the composite locale; and
   (ii) employing names for months of a year and days of a week employed by the second default locale for the composite locale.

3. The method of claim 1, wherein step (c) comprises the steps of:
   (i) employing monetary, numeric, time and date display formats employed by the first default locale for the composite locale; and
   (ii) employing names for months of a year, days of a week, abbreviations for days of the week and at least one message employed by the second default locale for the composite locale.

4. The method of claim 1, further comprising the step of storing the composite locale as a new default locale.

5. A method of generating a composite locale when a user-selected location and language combination is unsupported by existing default locales, comprising the steps of:
   (a) identifying a first default locale which employs formatting data for a selected location;
   (b) identifying a second default locale which employs formatting data for a selected language; and
   (c) automatically generating the composite locale for the user-selected location and language combination from the first and second default locales.

6. The method of claim 5, wherein step (c) comprises the steps of:
   (i) employing monetary, numeric, time and date display formats employed by the first default locale for the composite locale; and
   (ii) employing names for months of the year and days of a week employed by the second default locale for the composite locale.

7. The method of claim 5, further comprising the the step of storing the composite locale as a new default locale.

8. A system for independently configuring international location and language in an operating system, comprising:
   (1) means for selecting a location and a language combination;
   (2) means for determining whether the selected combination is supported by an existing default locale; and
   (3) means for generating a composite locale for specifying output formats consistent with the selected combination, if the selected combination is not supported by a default locale, said generating means comprising
      (a) means for identifying a first default locale which employs formatting data for the selected location;
      (b) means for identifying a second default locale which employs formatting data for the selected language; and
      (c) means for automatically generating the composite locale for the selected combination from the first and second default locales.

9. The system of claim 8, wherein said means for automatically generating the composite locale comprises:
   means for employing monetary, numeric, time and date display formats employed by the first default locale for the composite locale; and
   means for employing names for months of a year and days of a week employed by the second default locale for the composite locale.

10. The system of claim 8, wherein said means for automatically generating the composite locale comprises:
    means for employing monetary, numeric, time and date display formats employed by the first default locale for the composite locale; and
    means for employing names for months of a year, days of a week, abbreviations for days of the week and at least one message employed by the second default locale for the composite locale.

* * * * *